(12) United States Patent
Cohen

(10) Patent No.: US 7,562,147 B1
(45) Date of Patent: Jul. 14, 2009

(54) BI-DIRECTIONAL HTTP-BASED RELIABLE MESSAGING PROTOCOL AND SYSTEM UTILIZING SAME

(75) Inventor: Shy Cohen, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 770 days.

(21) Appl. No.: 09/676,924

(22) Filed: Oct. 2, 2000

(51) Int. Cl.
*G06F 15/16* (2006.01)
(52) U.S. Cl. ...................................... 709/228
(58) Field of Classification Search ................. 709/218,
709/227–229, 234, 203, 206, 223, 246, 226,
709/224; 707/10; 713/201; 370/230, 310,
370/312, 395.21, 238, 221.01, 401, 462,
370/442
See application file for complete search history.

(56) References Cited

U.S. PATENT DOCUMENTS

| | | | | |
|---|---|---|---|---|
| 5,805,804 A | * | 9/1998 | Laursen et al. | 709/223 |
| 5,941,988 A | * | 8/1999 | Bhagwat et al. | 713/201 |
| 6,104,716 A | * | 8/2000 | Crichton et al. | 370/401 |
| 6,119,167 A | * | 9/2000 | Boyle et al. | 709/234 |
| 6,154,465 A | * | 11/2000 | Pickett | 370/466 |
| 6,161,130 A | * | 12/2000 | Horvitz et al. | 709/206 |
| 6,212,565 B1 | * | 4/2001 | Gupta | 709/229 |
| 6,298,045 B1 | * | 10/2001 | Pang et al. | 370/261 |
| 6,330,561 B1 | * | 12/2001 | Cohen et al. | 707/10 |
| 6,360,270 B1 | * | 3/2002 | Cherkasova et al. | 709/229 |
| 6,374,300 B2 | * | 4/2002 | Masters | 709/229 |
| 6,389,462 B1 | * | 5/2002 | Cohen et al. | 709/218 |
| 6,411,986 B1 | * | 6/2002 | Susai et al. | 709/203 |
| 6,415,027 B1 | * | 7/2002 | Malik | 379/221.01 |
| 6,457,054 B1 | * | 9/2002 | Bakshi | 709/227 |
| 6,473,437 B2 | * | 10/2002 | Stumer | 370/462 |

(Continued)

OTHER PUBLICATIONS

BEA, "BEA WebLogic Server 5.1: Setting up WebLogic as an HTTP server", Feb. 23, 2000, BEA Systems, Inc., 28 pages.*

(Continued)

*Primary Examiner*—Andrew Caldwell
*Assistant Examiner*—Grant Ford
(74) *Attorney, Agent, or Firm*—Workman Nydegger

(57) ABSTRACT

A system and protocol for enabling bi-directional HTTP-based reliable messaging through a Web proxy server via the Internet is presented. The client processor residing on the private computer network side of the Web proxy establishes two virtual channels with a server. One of the channels is used for outgoing messages from the client to the server, and message delivery acknowledgments. The other channel is used for incoming messages from the server to the client, and message delivery acknowledgments. This incoming channel is established and maintained by the client through the Web proxy server so that the client has full control over the channel. The establishment is accomplished by the transmission of an HTTP-based "request" to the server. The server does not respond until and unless it has a message to be transmitted to the client. Once such a message is generated, the server generates an HTTP-based "reply" to this request, and transmits it to the client via the Web proxy server. The client then sends another HTTP-based request to the server with the message acknowledgment included therein. The client may request that the server reply to the request after some period of time to allow the client to assess the health of the connection and avoid connection time out disconnections by the Web proxy server. This period may be fixed or may be dynamically adjusted.

18 Claims, 3 Drawing Sheets

U.S. PATENT DOCUMENTS

| | | | |
|---|---|---|---|
| 6,477,150 B1 * | 11/2002 | Maggenti et al. | 370/312 |
| 6,519,646 B1 * | 2/2003 | Gupta et al. | 709/229 |
| 6,546,425 B1 * | 4/2003 | Hanson et al. | 709/227 |
| 6,557,038 B1 * | 4/2003 | Becker et al. | 709/227 |
| 6,584,321 B1 * | 6/2003 | Coan et al. | 455/466 |
| 6,606,645 B1 * | 8/2003 | Cohen et al. | 709/203 |
| 6,631,416 B2 * | 10/2003 | Bendinelli et al. | 709/227 |
| 6,640,241 B1 * | 10/2003 | Ozzie et al. | 709/204 |
| 6,650,621 B1 * | 11/2003 | Maki-Kullas | 370/238 |
| 6,697,847 B2 * | 2/2004 | Iwata | 709/218 |
| 6,721,288 B1 * | 4/2004 | King et al. | 370/310 |
| 6,725,272 B1 * | 4/2004 | Susai et al. | 709/229 |
| 6,789,119 B1 * | 9/2004 | Zhu et al. | 709/227 |
| 6,910,063 B1 * | 6/2005 | Ramanathan et al. | 709/203 |
| 6,959,327 B1 * | 10/2005 | Vogl et al. | 709/219 |
| 7,062,570 B2 * | 6/2006 | Hong et al. | 708/238 |
| 7,120,692 B2 * | 10/2006 | Hesselink et al. | 709/225 |
| 2001/0048683 A1 * | 12/2001 | Allan et al. | 370/395.21 |
| 2002/0016839 A1 * | 2/2002 | Smith et al. | 709/224 |
| 2002/0046294 A1 * | 4/2002 | Brodsky et al. | 709/246 |
| 2003/0137938 A1 * | 7/2003 | Belanger et al. | 370/230 |
| 2003/0208600 A1 * | 11/2003 | Cousins | 709/227 |
| 2003/0219029 A1 * | 11/2003 | Pickett | 370/442 |

OTHER PUBLICATIONS

BEA, "BEA WebLogic Server 5.1: Setting WebLogic properties", Feb. 23, 2000, BEA Systems, Inc., 47 pages.*

Cohn et al., "Prefetching the Means for Document Transfer: A New Approach for Reducing Web Latency", 2000 IEEE, pp. 854-863.*

Cohen et al., "Improving Enf-to-End Performance of the Web Using Server Volumes and Proxy Filters", 1999 ACM, pp. 241-253.*

Barford et al., "A Performance Evaluation of Hyper text Transfer Protocols", 1999 ACM, pp. 188-197.*

Gettys et al., "HTTP Connection Management (draft-ietf-http-connection-00.txt) (fwd)", Mar. 1997, 15 pages.*

Mogul Jeffrey, "The Case Persistent-Connection HTTP", 1995 ACM, pp. 299-313.*

Gruber et al., "Protocol Considerations for a Prefix-Caching Proxy for Multimedia Streams", AT&T Labs Research, 15 pages.*

Davison et al., "Implementing A Web Proxy Evaluation Architecture", Lehigh University, 12 pages.*

Anderson et al., "Improving Web Availability for Clients with MONET", Carnegie Mellon University, 14 pages.*

TIB/Rendezvous, *World-class Messaging for e-Business Infrastructures*, TIBCO Software, Palo Alto, CA, Copyright 2000, 2 pages.

Message Queuing (MSMQ) Start Page *at* http://msdn.microsoft.com/library/psdk/msmg/msmg_overview_4ilh.htm (last visited Jul. 14, 2000), 2 pages.

MQSeries: Message Oriented Middleware *at* http://www-4.com/software/ts/mqseries/library/whitepapers/mqover/ (last visited Jul. 13, 2000), 6 pages.

RTTP White Paper, *An Introduction to a Standard Internet Protocol for Streaming Market Data* Citynet, 7 pages.

High-Quality Netcasting Seen on the Horizon, Multimedia Monitor (Phillips Business Information), Mar. 1997, at 15, 3.

Fielding, R., et al., "Hypertext Transfer Protocol—HTTP/1.1", *Network Working Group*, RFC 2616, Jun. 1999, pp. 1-165.

* cited by examiner

BI-DIRECTIONAL HTTP-BASED RELIABLE MESSAGING PROTOCOL AND SYSTEM UTILIZING SAME

TECHNICAL FIELD

This invention relates generally to messaging protocols for application-to-application messaging over distributed computer networks, and more particularly to bi-directional, HTTP-based messaging protocols enabling asynchronous messaging over both private and public computer networks such as the Internet.

BACKGROUND OF THE INVENTION

Enterprise messaging systems enable computer programs to exchange information. These applications may be distributed among various computers located within a particular physical location, or distributed across an enterprise computer network at disparate physical locations. These computers may be coupled through a Large Area Network (LAN), a Wide Area Network (WAN), etc. The enterprise messaging systems that enable such communication, such as Microsoft's Message Queuing (MSMQ) assume that senders and receivers are symmetrical in their messaging capabilities, and that there is seamless direct connectivity between the sending and the receiving applications. Such communication utilizes a peer-to-peer communication model that allows either peer to generate and transmit messages to the other peer.

As computer networks expand, and as business-to-business (B2B) e-commerce continues to grow, the need for messaging between computers located on separate private networks across the Internet becomes more and more important. Unfortunately, many private computer networks are protected from the public Internet by a firewall or proxy system. Typically, web proxies mandate the use of the Hyper-Text Transfer Protocol (HTTP) as an enabling protocol on top of which higher-level protocols may be built. Because web proxies mandate the use of HTTP as enabling protocol, they create a setting in which the sender and receiver do not have the same, or symmetrical, capabilities. Specifically, in the HTTP protocol environment, the Internet-deployed party cannot directly, and without assistance, send messages to the party within the corporate firewall. As a result, this changes the communication model from a peer-to-peer communication model to a client-server communication model. As such, the "server" is unable to communicate directly with the "client" unless and until the "client" has initiated a communication session through the web proxy or firewall. With this limitation on the client-server communication model dictated by the HTTP protocol, true peer-to-peer messaging is no longer possible.

By design, HTTP is a request-response protocol in which data exchanges are initiated by a web client. This is true for both direct client-to-server connections as well as for indirect connections facilitated by a web proxy server. HTTP requires that the web client send a request to the web server, and that the web server reply to the client. When a web proxy is utilized to isolate the public Internet from the private intranet or other private computer network, HTTP requires that the client send a request to the web proxy, which then forwards the request to the web server. In reply, the web server sends the web proxy a response to this forwarded request. It is then the web proxy that relays this server response to the client. Because of this web proxy limitation mandating the use of HTTP, communication protocols built on top of HTTP do not allow a web server to send unsolicited data to a client. In this context, unsolicited refers to data that is not sent as a reply to a client's request for information.

One system that has been devised to overcome the HTTP client-server model communications problem for messaging is known as polling. Under this polling system, the "client" processor periodically and frequently sends out an HTTP request for messages as illustrated in the timeline of FIG. 5. As may be seen from this timeline, the client processor periodically transmits message requests 101, 103, 105, 107, etc. to the server. The frequency at which these messages are sent from the "client" to the "server" is dependent upon the application's data processing needs, and is often within the realm of once per second. Unfortunately, this polling technique greatly increases network traffic, especially in situations where the "server" has no messages to be sent to the "client". For each polling request that results in the delivery of a message in a polling reliable messaging system, 101, 103, 105, 107, etc., the HTTP-governed three-way handshake is conducted. That is, for each information poll request sent by the "client" to the "server", a response must be generated by the "server" providing the message as an acknowledgement of the information request, which in turn must be followed by an acknowledgement back from the "client" to complete the three-way handshake procedure governed by HTTP. If there is no message waiting, the server can simply reply with a "no messages waiting" response. The server does not need to wait for the client to confirm the receipt of this message because it does not require any state change in the server. A further disadvantage of this type of system exists since no information is capable of being sent from the "server" to the "client" unless and until the polling request message is received. During periods of heavy activity, the server may generate a significant number of messages. These messages must be queued until the next opportunity to transmit to the "client" in response to the next poll request. As may well be imagined, this may significantly delay the processing in both the "client" and the "server" processor, and may result in time-critical messages not being sent on time.

A protocol that does allow for a "server-push" model of communication whereby the server may provide unsolicited data to a client residing on the private side of a web proxy is known as the Real Time Trading Protocol (RTTP). This protocol is utilized to provide real-time stock quotes and other real-time financial information over the Internet. However, the RTTP protocol does not provide for bi-directional communication between the client and server, but instead merely provides updated information for display at the client location. RTTP utilizes a technology known as smart tunneling and secure tunneling to penetrate the network web proxy firewall. RTTP may tunnel through a web proxy because the type of information transmitted is lightweight and can be wrapped within HTTP packets when appropriate. While such may not present a security concern for some networks, many sophisticated corporate firewalls and web proxies may not allow for such tunneling.

In view of the above, there exists a need for a reliable bi-directional HTTP-based message system that will allow distributed computers on opposite sides of web proxies to communicate in a virtual peer-to-peer relationship.

SUMMARY OF THE INVENTION

The system and method of the instant invention involve an HTTP-based, reliable messaging protocol that enables bi-directional reliable messaging through a Web Proxy Server. As discussed above, HTTP is a request-response protocol in which all data exchanges are initiated by the Web client. This is true for direct client to server connections and indirect connections facilitated by a Web Proxy Server. For direct client to server connections, the HTTP protocol directs that the Web client send a request to the Web server, and that the Web server reply to the client. The Web Proxy Protocol, on the other hand, directs that the client send a request to the web proxy and that the proxy forward the request to the web server. In response, the Web server sends the Web proxy a response to the request, and the Web proxy relays that response to the client. This protocol requirement does not allow a Web server using a communication protocol built on top of HTTP to send unsolicited data to the client. As a result, current messaging protocols require that the client periodically, and with great frequency, transmit requests for messages through the Web proxy to the Web server.

The protocol of the invention solves this problem and enables the sending of bi-directional unsolicited messages through a Web proxy server. The new protocol uses two client-initiated virtual channels to enable this bi-directional messaging. One channel is for client-to-server communication and server message delivery acknowledgments. The other virtual channel is for server-to-client communication and client message delivery acknowledgments.

In a preferred embodiment, a method of bi-directionally communicating between an application residing on a first processor on a private computer network and an application residing on a second processor not on the private computer network is presented. In this embodiment, the communication path includes a public computer network and a proxy server coupled to the private computer network and separating the private computer network from the public computer network. The method of this embodiment comprises the establishing of a first communication channel between the two processors through the proxy server to allow the transfer of messages from the first processor to the second processor. This channel also allows the delivery of message delivery acknowledgments from the second processor to the first processor. In accordance with the invention, this method further includes the establishing of a second communication channel between the two processors through the proxy server to allow the transfer of messages from the second processor to the first processor. This second channel also allows the delivery of message delivery acknowledgments from the first processor to the second processor.

A computer-readable medium having computer-executable instructions for performing the above method is also presented in another embodiment of the invention.

In an alternate embodiment of the instant invention, a method of enabling transmission of unsolicited messages from a server to a client is presented. In this embodiment, the client resides on a private computer network and has a proxy server positioned between the private computer network and a public computer network. Further, the server transmits the unsolicited messages over the public computer network. The method of this embodiment comprises the transmitting of an HTTP-based request to the server via the proxy server to open a persistent connection. This HTTP-based request requests a reply from the server only when the server has messages to send to the client.

A computer-readable medium having computer-executable instructions for performing the above method is also presented in another embodiment of the invention.

In a further alternate embodiment, a method of transmitting unsolicited HTTP-based messages via a public computer network to a client residing on a private computer network that includes a proxy server is presented. In this embodiment of the invention, the method comprises the receiving of an HTTP-based request originating from the client through the proxy server, and the parking of the HTTP-based request without responding thereto unless a message is generated that needs to be transmitted to the client. When the message is generated, the method of this embodiment generates an HTTP-based reply to the HTTP-based request parked for the client. This HTTP-based reply contains the message. Finally, the method of the invention transmits the HTTP-based reply.

A computer-readable medium having computer-executable instructions for performing the above method is also presented in another embodiment of the invention.

Additional features and advantages of the invention will be made apparent from the following detailed description of illustrative embodiments which proceeds with reference to the accompanying figures.

BRIEF DESCRIPTION OF THE DRAWINGS

While the appended claims set forth the features of the present invention with particularity, the invention, together with its objects and advantages, may be best understood from the following detailed description taken in conjunction with the accompanying drawings of which:

DETAILED DESCRIPTION OF THE INVENTION

Figure 1:
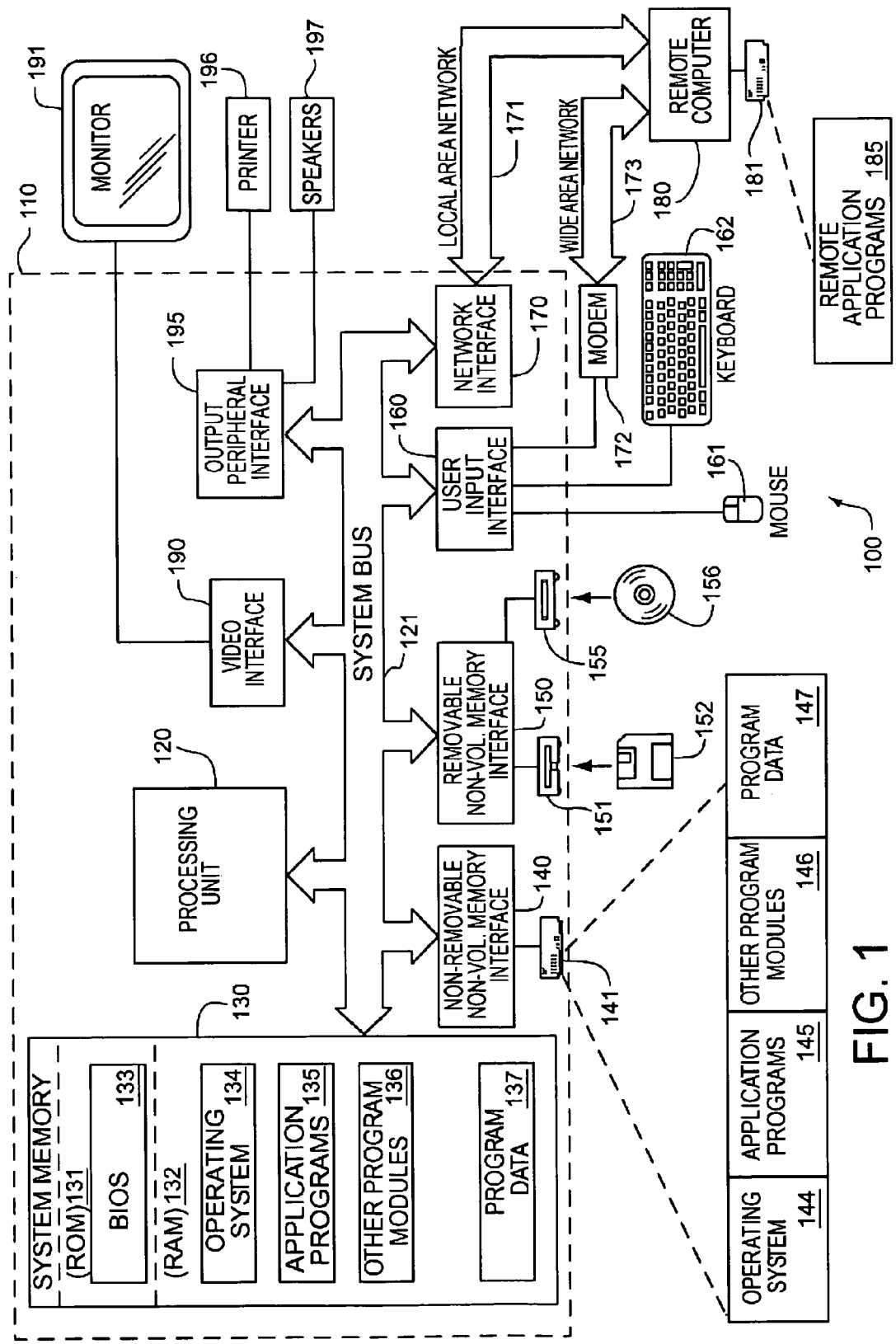
FIG. 1 is a block diagram generally illustrating an exemplary computer system on which the present invention may reside.

Turning to the drawings, wherein like reference numerals refer to like elements, the invention is illustrated as being implemented in a suitable computing environment. Although not required, the invention will be described in the general context of computer-executable instructions, such as program modules, being executed by a personal computer. Generally, program modules include routines, programs, objects, components, data structures, etc. that perform particular tasks or implement particular abstract data types. Moreover, those skilled in the art will appreciate that the invention may be practiced with other computer system configurations, including hand-held devices, multi-processor systems, microprocessor based or programmable consumer electronics, network PCs, minicomputers, mainframe computers, and the like. The invention may also be practiced in distributed computing environments where tasks are performed by remote processing devices that are linked through a communications network. In a distributed computing environment, program modules may be located in both local and remote memory storage devices.

FIG. 1 illustrates an example of a suitable computing system environment 100 on which the invention may be implemented. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention is operational with numerous other general purpose or special purpose computing system environments or configurations. Examples of well known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, etc. that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices.

With reference to FIG. 1, an exemplary system for implementing the invention includes a general purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Associate (VESA) local bus, and Peripheral Component Interconnect (PCI) bus also known as Mezzanine bus.

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable, volatile/nonvolatile computer storage media. By way of example only, FIG. 1 illustrates a hard disk drive 140 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1, provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies. A user may enter commands and information into the computer 110 through input devices such as a keyboard 162 and pointing device 161, commonly referred to as a mouse, trackball or touch pad. Other input devices (not shown) may include a microphone, joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 195.

The computer 110 may operate in a networked environment using logical connections to one or more remote computers, such as a remote computer 180. The remote computer 180 may be another personal computer, a server, a router, a network PC, a peer device or other common network node, and typically includes many or all of the elements described above relative to the personal computer 110, although only a memory storage device 181 has been illustrated in FIG. 1. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the personal computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the personal computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

In the description that follows, the invention will be described with reference to acts and symbolic representations of operations that are performed by one or more computer, unless indicated otherwise. As such, it will be understood that such acts and operations, which are at times referred to as being computer-executed, include the manipulation by the processing unit of the computer of electrical signals representing data in a structured form. This manipulation transforms the data or maintains it at locations in the memory system of the computer, which reconfigures or otherwise alters the operations of the computer in a manner well understood by those skilled in the art. The data structures where data is maintained are physical locations of the memory that have particular properties defined by the format of the data. However, while the invention is being described in the foregoing context, it is not meant to be limiting as those of skill in the art will appreciate that various of the acts and operation described hereinafter may also be implemented in hardware.

Figure 2:
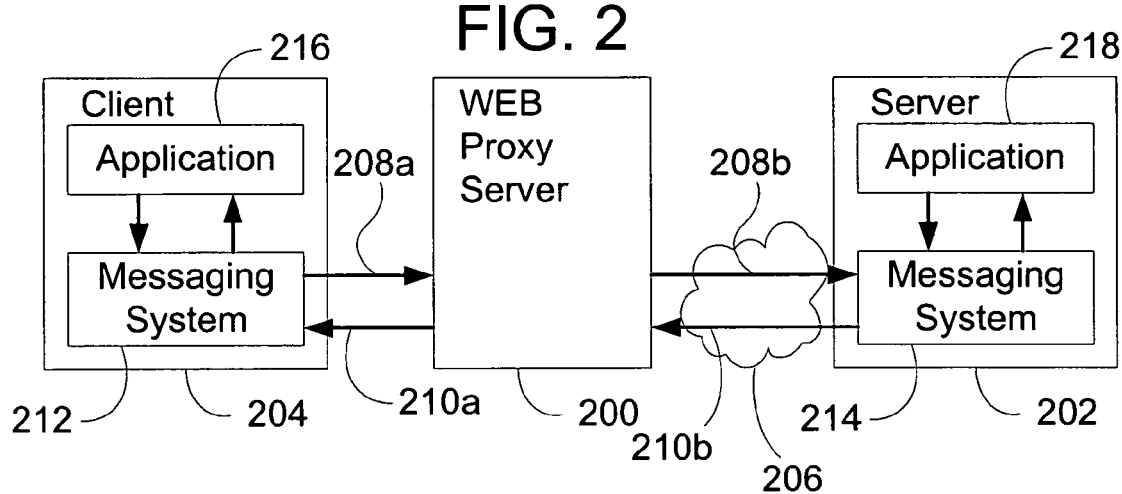
FIG. 2 is a block diagram generally illustrating a system embodying the teachings of the instant invention engaging in bi-directional HTTP-based messaging through a web proxy server.
Figure 5:
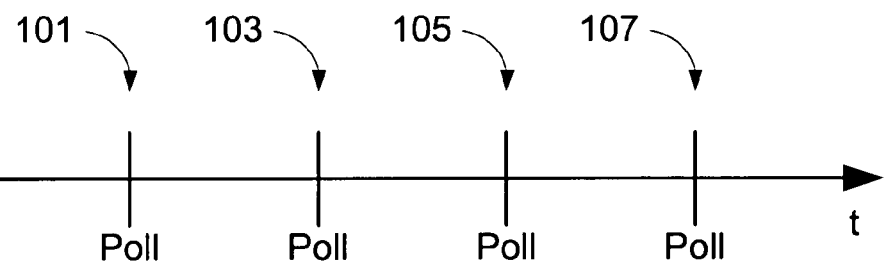
FIG. 5 is a timing diagram illustrating a prior art polling communication protocol enabling communication between a client and a server.

The protocol of the instant invention enables a system, such as that illustrated in FIG. 2, to communicate with bi-directional unsolicited messages through a web proxy server 200 between a "server" 202 and a "client" 204 via a public computer network, such as the Internet 206. In accordance with the instant invention, two client-initiated virtual channels 208, 210 are established to enable this bi-directional unsolicited communication. One of the channels 208 is established for client-to-server communications and server message delivery acknowledgements. The other virtual channel 210 is used for server-to-client communication and client message delivery acknowledgements. As illustrated in FIG. 2, each of the virtual channels 208, 210 may be considered in two portions. A first portion of each of the virtual channels 208a, 210a exists on the private or client side of the web proxy server 200. The second portion of each of these virtual channels 208b, 210b exists on the public network side of the web proxy server 200, e.g. on the Internet side of the web proxy server 200.

As may be seen from this FIG. 2, the protocol of the instant invention is utilized within a messaging system 212 within the client 204, and within a messaging system 214 within the server 202. These messaging systems 212, 214 enable the bi-directional unsolicited transfer of messages between applications 216, 218 within the client 204 and server 202, respectively. Through the messaging system 212, 214 and protocol of the instant invention, the application programs 216, 218 may communicate in a virtual peer-to-peer relationship through the web proxy server 200 via the Internet 206 as if their host machines were physically coupled through a private network utilizing a peer-to-peer communications model. In this way, the capabilities and benefits of a bi-directional computer messaging system may be incorporated into Internet-based remote computing systems and business-to-business integration technologies and business to consumer electronic commerce technologies that extensively use and rely on the Internet. The protocol serves as a core technology for reliable Internet messaging because it enables clients to receive and send messages in an efficient manner without the need for any facilitating communication to allow the server to send messages to the client (such as the above-described polling system that requires the client to periodically query the server for messages). Compared with such a system, the system and protocol of the instant invention is more efficient with regard to network traffic and server loading, and reduces processing latencies necessitated by the queuing of messages often required in polling.

When an application 216 on the private-network side of the web proxy server 200 (executing on the client 204) wishes to engage in bi-directional messaging with an application 218 on the public network side of the web proxy server 200 (the server 202), the client 204 opens two virtual channels 208, 210. One channel 208 is established for outgoing traffic, and the other channel 210 is established for incoming traffic. While bi-directional messaging is the common situation, the client 204 may choose to open only the outgoing 208 or incoming 210 channels. In a preferred embodiment, the client 204 has sole responsibility when it comes to establishing and maintaining the connections, including but not limited to the reconnection policy in the channels it wishes to establish. This protects the client 204 from unwanted traffic, and gives the client 204 control of network usage and cost. This is advantageous for users that may have per minute connections fees and who wish to minimize the time that they are connected to the server 202. Those clients may prefer to work in bursts of communication, as opposed to message trickle. Administrators of large networks, on the other hand, may prefer network users to work in a trickle mode, since such a mode gives better network load distribution and helps prevent temporal network congestion resulting from multiple clients initiating burst communication during the same period of time.

Figure 3:
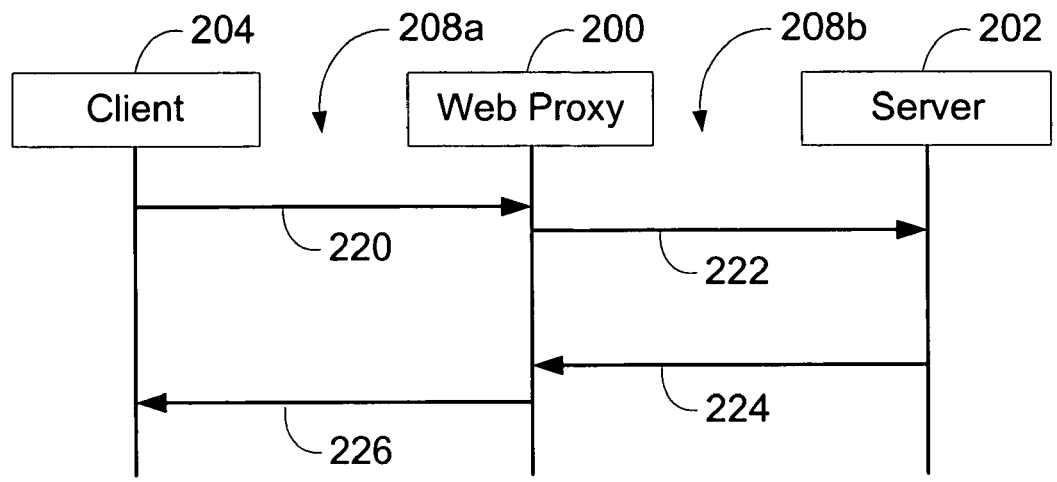
FIG. 3 is a communication flow diagram illustrating messaging between a client and a server through a web proxy server on an outgoing channel established in accordance with one aspect of the instant invention.

The outbound communication channel 208 is intended for client-to-server messaging and server message delivery acknowledgements. This channel 208 uses the HTTP messaging pattern as illustrated in FIG. 3. As may be seen from this FIG. 3, the client 204 sends 220 an HTTP request with the message body to the web proxy 200, which then forwards 222 the request to the server 202. The server 202 then sends 224 an HTTP reply with a delivery or non-delivery acknowledgement. This reply is received by the web proxy 200, which then returns 226 the reply to the client 204. The server 202 may ask for retransmission of the original message or a previous message, and in cases where a reply is required, the server 202 may provide the client 204 with information as to when a reply for that message will be available. The client 204 may decide when and if to use any information provided by the server 202. For example, the client 204 may use this information and a reconnection policy to determine when it needs to open an inbound channel 210 (see FIG. 2) with the server 202 to receive the information.

Figure 4:
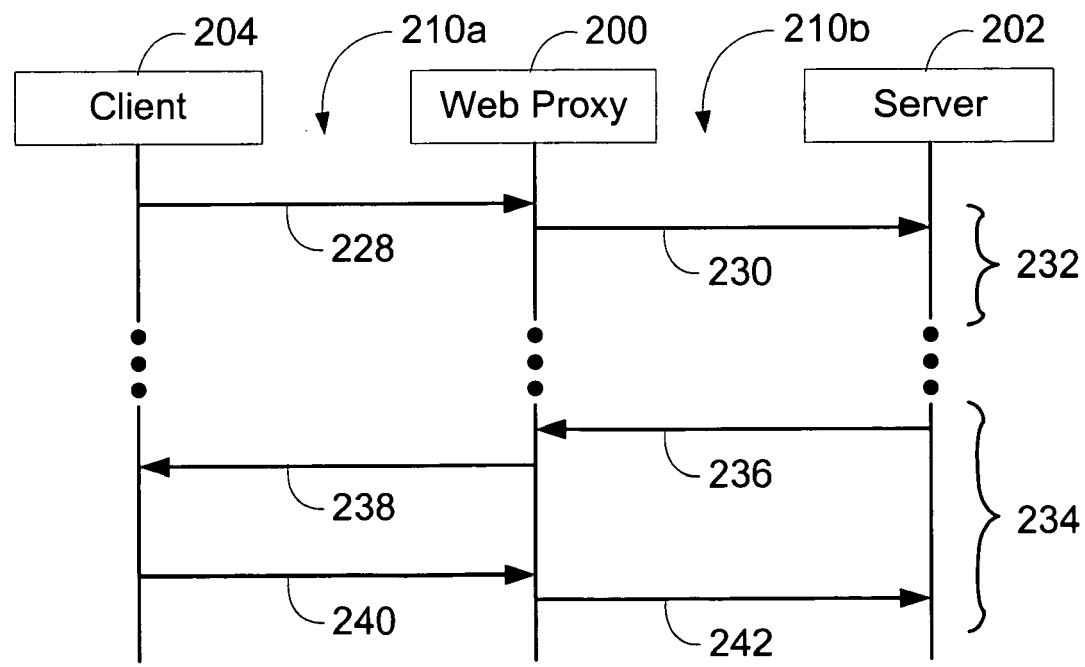
FIG. 4 is a communication flow diagram illustrating messaging between a client and a server through a web proxy server on an incoming channel established in accordance with another aspect of the instant invention.

The inbound communication channel 210 is for server-to-client communication and client message delivery acknowledgements. This channel 210 uses a messaging pattern that is reversed from the normal HTTP communication pattern as illustrated in FIG. 4 to which specific reference is now made. To initiate this channel 210, the client 204 sends 228 an HTTP "request" (i.e., a first HTTP-based "request") asking for messages to the web proxy 200, which then forwards 230 this "request" to the server 202 where it is parked. This parking of an HTTP "request" at the server 202 establishes a connection setup phase 232 of this inbound communication channel 210. The parked "request" enables the server 202 to reply to the client 204 whenever the server 202 has a message that needs to be sent.

During this communication phase 234, the server 202 sends 236 an HTTP "reply" with the message content to the web proxy 200, which will forward 238 the "reply" with the message content to the client 204. This "reply" is in response to the parked "request" previously delivered during the connection setup phase 232, and embodies the message that needs to be sent from the server 202 to the client 204. In response to the receipt of this "reply", the client 204 will send 240 a delivery acknowledgement as an HTTP "request" (i.e., a second, third, or subsequent HTTP-based "request") in to the web proxy 200, which will then forward 242 the HTTP "request" with the message acknowledgement to the server 202. This acknowledgement will act as the parked request (i.e., a second, third, or subsequent HTTP-based "request") to which the server may then respond with the next message whenever the server 202 generates such a message.

Unlike polling systems that only allow the server to send messages at the discrete times of the polling messages, under the protocol of the instant invention the HTTP "request" (i.e. the first, second, third, or subsequent HTTP-based "request") is parked at the server 202 to enable the server to transmit messages at any point in time that the messages are generated. This significantly increases the efficiency of the message transfer since the messages must no longer be queued at the server 202 to await a polling request before they may be delivered to the client 204. Likewise, the client-generated HTTP message acknowledgement is embodied in a HTTP "request" (i.e., a second, third, or subsequent HTTP-based "request") that serves to acknowledge that the previous message was successfully delivered, and servers as a parked "request." This newly parked request once again allows the server 202 to transmit messages to the client 204 as soon as they are generated within the server 202.

Since messaging on the Internet is subject to varying network conditions, connections may be brought down, different networking layers may time out in cases where no data flows through them for prolonged periods of time, servers may become unavailable, etc., all resulting in a loss of the connection. In the event where the client and server connections are severed, it is the responsibility of the client to detect this and to try to reconnect to the server 202. That is, the client 204 is responsible for network state detection and session reconnection. If the connection is lost because the web proxy server 200 times out and closes the connection, the proxy 200 typically sends a connection closure message to the client 204. In such an event, the client 204 merely retransmits an HTTP "request" to the server 202 as illustrated by message transmission 228, 230, establishing the connection setup phase 232 of FIG. 4.

While the web proxy 200 typically notifies the client 204 when it severs a connection, other disconnections may not provide such notification. To account for these connection losses, a preferred embodiment of the system and protocol of the instant invention periodically retransmits the HTTP "request" 228, 230 to ensure that the server 202 has a parked "request" to which it may respond whenever messages are generated therein. The time interval for these retransmissions may be established as desired, and may be in the realm of once every one to two minutes, or even as long as five minutes. For non-time-critical systems, this can safely be set to an hour or more. However, recognizing that TCP/IP will hold a connection open for approximately two days, the client 204 has wide latitude on selecting this retransmission interval as desired. These re-transmissions do not significantly increase network traffic because, unlike conventional polling systems, the server 202 does not respond to the "request" unless and until it has a message that it wishes to send to the client 204.

In an alternate embodiment of the system and protocol of the instant invention, the client generated "request" (e.g., a first request) that is sent to and parked at the server may include a request that the server send a reply after a period of time. This will ensure that the client's proxy server 200 will not time out and close the connection due to inactivity on the channel. In response to this "reply," the client will again send a "request" (e.g., a second request) that will remain parked at the server until it has a message to send, or until the suggested time for transmission of a reply to avoid proxy connection closure, i.e., even if there are no messages to send the client. The time period that the client specifies for this connection maintaining reply may be dynamically adjusted based on the particular proxy 200 employed by the client's system, or may be sent to a discrete value. Setting a discrete value provides some assurance to the client that the connection has not failed for some undetectable reason, such as a TCP/IP drop, etc.

In order to adjust the time for the reply dynamically, the client may first request that a reply not be sent at all, or may include a long time period such as 5 minutes, for example. If the client receives a connection time out closure message from the proxy, the client can then calculate a retransmit period less than the time out period. The client can then use this time in the request that it sends to the server to re-open the connection. If the client receives another connection closure message from the proxy due to a time out, the client may reduce the retransmit period and include this new period in the next request that is transmitted to and parked at the server.

As will be recognized by those skilled in the art from the foregoing discussion, the protocol of the instant invention allows different message interaction patterns, including but not limited to single-sided client messages, single-sided server messages, bi-directional message exchange, and "conversation" (a "conversation" is a series of message exchanges that are related to one another). Further, the protocol of the instant invention does not limit the kind or number of message exchange patterns that can occur concurrently. For example, different conversations may be held between different applications at the same time using the same virtual sessions.

In view of the many possible embodiments to which the principles of this invention may be applied, it should be recognized that the embodiment described herein with respect to the drawing figures is meant to be illustrative only and should not be taken as limiting the scope of invention. For example, those of skill in the art will recognize that the elements of the illustrated embodiment shown in software may be implemented in hardware and vice versa or that the illustrated embodiment can be modified in arrangement and detail without departing from the spirit of the invention. Therefore, the invention as described herein contemplates all such embodiments as may come within the scope of the following claims and equivalents thereof.

I claim:

1. A method of bi-directionally communicating between an application residing on a first processor on a private computer network and an application residing on a second processor not on the private computer network in order to allow for the delivery of unsolicited messages to be received from the second processor, the communication path including a public computer network and a proxy server coupled to the private computer network and separating the private computer network from the public computer network, the method comprising:

transmitting a first HTTP-based "request" from the first processor to the second processor for establishing a first communication channel between the first processor and the second processor through the proxy server to allow the transfer of first messages from the first processor to the second processor, and the delivery of first message delivery acknowledgments from the second processor to the first processor;

transmitting a first parked HTTP-based "request" from the first processor to be parked at the second processor for establishing a persistent communication channel between the first processor and the second processor through the proxy server to allow the transfer of second messages from the second processor to the first processor, and the delivery of second message delivery acknowledgments from the first processor to the second processor, and wherein the first parked HTTP-based "request" includes therein a request that the second processor transmit a reply after the expiration of a time period even if there are no messages to send to the first processor so that the first processor can assess a status of the connection thereto;

receiving a first HTTP-based "reply" from the second processor to the first processor in response to the first parked HTTP-based "request"; and in response to receiving the first HTTP-based "reply", transmitting a second parked HTTP-based "request" via the proxy to the second processor, the second parked HTTP "request" including an acknowledgment to the first HTTP-based "reply" in order to maintain the persistent HTTP-based connection between the first processor and the second processor through the proxy server, and wherein the second parked HTTP-based "request" includes therein a request that the second processor transmit a reply after the expiration of a time period even if there are no messages to send to the first processor in order to ensure persistent connectivity between the first and second processor.

2. The method of claim 1, wherein the first HTTP-based "request" includes at least one of the first messages therein.

3. The method of claim 1, wherein the first HTTP-based "reply" includes at least one of the second messages therein.

4. The method of claim 1, wherein the first processor only receives the first HTTP-based "reply" from the second processor on the persistent communication channel when the second processor has at least one of the second messages to send to the first processor.

5. The method of claim 1, further comprising setting the time period to be less than two days.

6. The method of claim 1, further comprising setting the time period to be approximately five minutes.

7. The method of claim 1, further comprising dynamically adjusting the time period based upon a connection time out closure controlled by the proxy server.

8. A computer-readable storage medium having computer-readable instructions that, when executed by a processor of a computing device, cause the computing device to perform the method of claim 1.

9. The method of claim 7, wherein the dynamically adjusting of the time period comprises:

receiving a connection time out closure message from the proxy server;

determining a first time between transmitting the second HTTP-based "request" and receiving a connection time out closure message from the proxy server; and calculating a new time period to be less than the first time and less than the time period.

10. A method of enabling transmission of unsolicited messages from a server to a client by ensuring that a persistent connection between the server and the client does not time out, wherein the client resides on a private computer network having a proxy server between the private computer network and a public computer network, and wherein the server transmits the unsolicited messages over the public computer network, the method comprising:

selecting by a client a connection time out period used in order to determine a time duration in which the client is to receive a "reply" message from a server in order to ensure persistent connectivity between the client and the server;

allowing the client to include the connection time out period in a parked HTTP-based "request" sent from the client to be parked at the server for requesting an HTTP-based "reply" from the server after the expiration of the connection time out period even if there are no messages to send to the client in order to avoid connection termination by the proxy server due to communication inactivity; and transmitting the parked HTTP-based "request" to the server via the proxy server to open a persistent connection therewith.

11. The method of claim 10, further comprising dynamically adjusting the connection time out period to avoid connection termination by the proxy server due to communication inactivity.

12. The method of claim 10, further comprising:

receiving a connection time out closure message from the proxy server indicating that the proxy server has closed the persistent connection;

calculating a connection time out period from the transmitting of the parked HTTP-based "request" to the receiving of the connection time out closure message; and transmitting a second parked HTTP-based "request" to the server via the proxy server to open a persistent connection therewith, the second parked HTTP-based "request" requesting a reply from the server when the server has messages to send to the client and after the expiration of the connection time out period if there are no messages to send to the client.

13. A computer-readable storage medium having computer-readable instructions that when executed by a processor of a computing device, cause the computing device to perform the method of claim 10.

14. The method of claim 11, wherein the step of dynamically adjusting the connection time out period comprises:

receiving a connection time out closure message from the proxy server;

upon receiving the time out closure message from the proxy server, calculating a new time period from the transmitting of the HTTP-based "request" to the receiving of the connection time out closure message;

reducing the connection time out period to be less than the new time period and less than a current value of the connection time out period in order to create a new connection time out period;

including the new connection time out period in a second parked HTTP-based "request" for requesting an HTTP-based "reply" from the server after the expiration of the new connection time out period even if there are no messages to send to the client in order to avoid connection termination by the proxy server due to communication inactivity; and transmitting the second parked HTTP-based "request" to the server via the proxy server to maintain the persistent connection therewith.

15. The method of claim 12, further comprising:

receiving a second connection time out closure message from the proxy server;

reducing the connection time out period to form a new connection time out period shorter in duration than the connection time out period; and transmitting a third parked HTTP-based "request" to the server via the proxy server to open a persistent connection therewith, the third parked HTTP-based "request" requesting a reply from the server when the server has messages to send to the client and after the expiration of the new connection time out period if there are no messages to send to the client.

16. A method of transmitting unsolicited HTTP-based messages via a public computer network to a client residing on a private computer network, the private computer network including a proxy server, the method comprising:

receiving an HTTP-based "request" originating from the client through the proxy server, wherein the HTTP-based "request" includes a first connection time out period used in order to determine a time duration in which the client is to receive a "reply" message in order to ensure persistent connectivity between the client and a server; and parking the HTTP-based "request" without responding thereto unless a message is generated that needs to be transmitted to the client or unless the first connection time out period expires, the parking of the HTTP-based "request" establishing a persistent connection from the client through the proxy server; and when the message is generated or the first connection time out period expires, generating an HTTP-based "reply" to the HTTP-based "request" parked for the client, the HTTP-based "reply" containing the message therein;

transmitting the HTTP-based "reply";

receiving a second HTTP-based "request" including a message acknowledgment from the client through the proxy server acknowledging the receipt of the HTTP-based "reply" and also including a second connection time out period; and parking the second HTTP-based request without responding thereto unless a message is generated that needs to be transmitted to the client or unless the second connection time out period expires, the parking the second HTTP-based request maintaining the persistent connection from the client through the proxy server.

17. The method of claim 16, wherein the second connection time out period is different than the first connection time out period.

18. A computer-readable storage medium having computer-executable instructions that when executed by a processor of a computing device, cause the computing device to perform the method of claim 16.

* * * * *